United States Patent
Fox et al.

(10) Patent No.: US 10,533,239 B2
(45) Date of Patent: Jan. 14, 2020

(54) METHODS OF RECOVERING RARE EARTH ELEMENTS FROM A MATERIAL

(71) Applicants: Battelle Energy Alliance, LLC, Idaho Falls, ID (US); University of Idaho, Moscow, ID (US)

(72) Inventors: Robert Vincent Fox, Idaho Falls, ID (US); Bruce J. Mincher, Idaho Falls, ID (US); Mary Ellen Case, Idaho Falls, ID (US); Donna Ly Baek, Idaho Falls, ID (US); Chien M. Wai, Moscow, ID (US); Clive Yen, Moscow, ID (US); Horng-Bin Pan, Moscow, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 17 days.

(21) Appl. No.: 15/340,610

(22) Filed: Nov. 1, 2016

(65) Prior Publication Data

US 2018/0119251 A1    May 3, 2018

(51) Int. Cl.
*C22B 59/00*    (2006.01)
*C22B 3/24*    (2006.01)
(Continued)

(52) U.S. Cl.
CPC ............. *C22B 59/00* (2013.01); *B01D 15/00* (2013.01); *B01D 15/08* (2013.01); *B01J 8/00* (2013.01);
(Continued)

(58) Field of Classification Search
CPC .. C22B 3/24; C22B 3/22; C22B 59/00; C22B 3/44; C22B 7/006; B01J 19/10; B01J 8/00; B01D 15/00; B01D 15/08; C02F 1/42
See application file for complete search history.

(56) References Cited

U.S. PATENT DOCUMENTS

| 4,647,438 A | 3/1987 | Sabot et al. |
| 5,770,085 A | 6/1998 | Wai et al. |

(Continued)

FOREIGN PATENT DOCUMENTS

| CA | 2177555 A1 * 11/1997 ........... B01D 21/283 |
| CN | 101150032 A    3/2008 |

(Continued)

OTHER PUBLICATIONS

Binnemans, Koen et al. "Recycling of rare earths: a critical review." Journal of Cleaner Production. vol. 51, pp. 1-22. http://dx.doi.org/10,1016/j.jclepro.2012.12.037 (Year: 2013).*

(Continued)

*Primary Examiner* — Tima M. McGuthry-Banks
(74) *Attorney, Agent, or Firm* — TraskBritt

(57) ABSTRACT

A method of recovering rare earth elements from a rare earth-containing material comprises contacting the rare earth-containing material with a solution formulated and configured to dissolve rare earth elements from the rare earth-containing material and form a solution including a plurality of rare earth elements dissolved therein. The method further includes exposing the solution including the plurality of rare earth elements dissolved therein to one of a liquefied gas or a supercritical fluid to isolate the rare earth elements from each other. Related methods of removing and purifying rare earth elements from materials and phosphor lamps are also disclosed.

21 Claims, 7 Drawing Sheets

(51) Int. Cl.

| | |
|---|---|
| *C22B 3/44* | (2006.01) |
| *B01J 19/10* | (2006.01) |
| *B01J 8/00* | (2006.01) |
| *C22B 3/22* | (2006.01) |
| *C02F 1/42* | (2006.01) |
| *B01D 15/00* | (2006.01) |
| *B01D 15/08* | (2006.01) |
| *C22B 7/00* | (2006.01) |

(52) U.S. Cl.
CPC .............. *B01J 19/10* (2013.01); *C02F 1/42* (2013.01); *C22B 3/22* (2013.01); *C22B 3/24* (2013.01); *C22B 3/44* (2013.01); *C22B 7/006* (2013.01)

(56) References Cited

U.S. PATENT DOCUMENTS

| | | | |
|---|---|---|---|
| 6,187,911 B1 * | 2/2001 | Wai ................ | C22B 3/0005 210/634 |
| 6,800,112 B2 | 10/2004 | Fujiwara et al. | |
| 7,128,840 B2 | 10/2006 | Wai et al. | |
| 7,686,865 B2 * | 3/2010 | Wai ................ | C22B 3/02 75/396 |
| 8,137,645 B2 | 3/2012 | Porob et al. | |
| 8,282,703 B2 | 10/2012 | Gourishankar et al. | |
| 8,524,176 B2 | 9/2013 | Thakur | |
| 9,068,249 B2 | 6/2015 | Sugita et al. | |
| 2006/0011219 A1 | 1/2006 | Korth et al. | |
| 2008/0115627 A1 | 5/2008 | Wang et al. | |
| 2009/0162267 A1 | 6/2009 | Otto et al. | |
| 2010/0326918 A1 | 12/2010 | Theoleyre et al. | |
| 2011/0048231 A1 | 3/2011 | Sinha | |
| 2015/0143954 A1 | 5/2015 | Neumann et al. | |
| 2016/0053344 A1 * | 2/2016 | Francis ............ | C22B 3/24 75/711 |

FOREIGN PATENT DOCUMENTS

| | | | |
|---|---|---|---|
| CN | 100577830 | C | 1/2010 |
| CN | 101942298 | A | 1/2011 |
| CN | 102312098 | A | 1/2012 |
| CN | 102660688 | A | 9/2012 |
| CN | 104593591 | * | 5/2015 |
| CN | 104593608 | * | 5/2015 |
| EP | 3199650 | A4 * | 5/2018 |
| WO | 9533541 | A1 | 12/1995 |
| WO | 03104149 | A1 | 12/2003 |
| WO | 2013090817 | A1 | 6/2013 |
| WO | WO-2016047700 | * | 3/2016 |

OTHER PUBLICATIONS

WO 2016/047700 machine translation. (Year: 2015).*
CN 104593591 machine translation (Year: 2015).*
CN 10459608 machine translation (Year: 2015).*
"Eichrom Technologies' Product Catalog for 2014." Eichrom Techologies LLC. www.eichrom.com. pp. 1-60. (Year: 2014).*
BC Drug and Poison Information Centre, "Mercury in Compact Fluorescent Lamps (CFLs)" (2010) retrieved on Jan. 3, 2018 from http://www.dpic/org/faq/mercury-compact-fluorescent-lamps-cfls, 2 pages.
International Search Report from International Application No. PCT/US2017/059214, dated Jan. 26, 2018, 2 pages.
International Written Opinion from International Application No. PCT/US2017/059214, dated Jan. 26, 2018, 7 pages.
Shimizu et al., "Supercritical fluid extraction of rare earth elements from luminescent material in waste fluorescent lamps", J. of Supercritical Fluids 33 (3005), pp. 235-241.
Tunsu et al., "Sustainable processes development for recycling of fluorescent phosphorous powders—rare earths and mercury separation", Department of Chemical and Biological Engineering Industrial Material Recycling and Nuclear Chemistry, Chamers University of Technology, Gothenburg, Sweden, (2001), 65 pages.
Baek et al., "Extraction of Rare Earth Oxides Using Supercritical Carbon Dioxide Modified with Tri-n-Butyl Phosphate-Nitric Acid Adducts", American Chemical Society, Industrial & Engineering Chemistry Research, vol. 55 (2016) pp. 7154-7163.

* cited by examiner

US 10,533,239 B2

METHODS OF RECOVERING RARE EARTH ELEMENTS FROM A MATERIAL

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to methods of recovering mercury and rare earth elements from used materials. More particularly, embodiments of the disclosure relate to methods of extracting mercury and rare earth elements from a rare earth-containing material by dissolving rare earth elements in a solution to form a rare earth-laden fluid and selectively recovering the extracted rare earth elements from the rare earth-laden fluid as individual components.

BACKGROUND

Rare earth elements (REEs) are used in many household and industrial materials. For example, rare earth elements are used in phosphor powders of fluorescent lighting and light emitting diodes (LEDs), catalysts, magnets, electronic devices including computer memory, DVDs, illuminated screens of electronic devices (e.g., cathode ray tubes, plasma displays, etc.), rechargeable batteries, cellular phones, or other materials.

Unfortunately, the global supply of rare earth elements is limited. One potential source of rare earth elements is in recycled used devices and materials incorporating the rare earth elements, such as from used electronics, used rare earth magnets, or used phosphor fluorescent lamps.

Recycling of rare earth elements from used fluorescent lamps and other materials has presented technical and practical challenges. For example, rare earth-containing materials, such as lighting phosphors, often contain mercury, which may exist in several chemical forms. In addition, the rare earth elements used in the many materials are relatively inert and are conventionally present only in low concentrations. Further, the various rare earth elements contained in combination in the many materials exhibit relatively similar chemistries and are, therefore, difficult to isolate from each other. Because of the aforementioned and other difficulties associated with recovering substantially pure rare earth elements from used materials, recycling of rare earth elements from such materials has been both unsuccessful and uneconomical in the past.

BRIEF SUMMARY

In accordance with one embodiment described herein, a method of recovering rare earth elements from a rare earth-containing material comprises contacting the rare earth-containing material with a solution formulated and configured to dissolve rare earth elements from the rare earth-containing material and form a solution including a plurality of rare earth elements dissolved therein, and exposing the solution including the plurality of rare earth elements dissolved therein to one of a liquefied gas or a supercritical fluid to isolate the rare earth elements from each other.

In additional embodiments, a method of recovering rare earth elements from a material comprises exposing a material comprising a plurality of rare earth elements to a solution comprising one of a supercritical fluid or a liquefied gas, the solution comprising one or more of at least one acid adduct, at least one ligand, or at least one solvent modifier and configured and formulated to dissolve the rare earth elements to form a rare earth-laden fluid comprising dissolved rare earth elements therein, contacting an adsorbent within at least one resin bed with the rare earth-laden fluid and adsorbing at least some of the rare earth elements on the adsorbent to remove substantially all of the rare earth elements from the rare earth-laden fluid, and contacting the adsorbent with at least one solvent formulated and configured to strip at least some of the rare earth elements from the adsorbent.

In further embodiments, a method of recovering rare earth elements comprises dissolving rare earth elements from a rare earth-containing material in a solution to form a rare earth-laden fluid comprising a liquefied gas or a supercritical fluid and including a plurality of rare earth elements dissolved therein, and contacting the rare earth-laden fluid including the plurality of rare earth elements dissolved therein with at least one of an adsorbent formulated to adsorb the plurality of rare earth elements or an aqueous solution comprising one or more of an acid or one or more ligands to remove substantially all of the rare earth elements from the rare earth-laden fluid.

DETAILED DESCRIPTION

Figure 1:
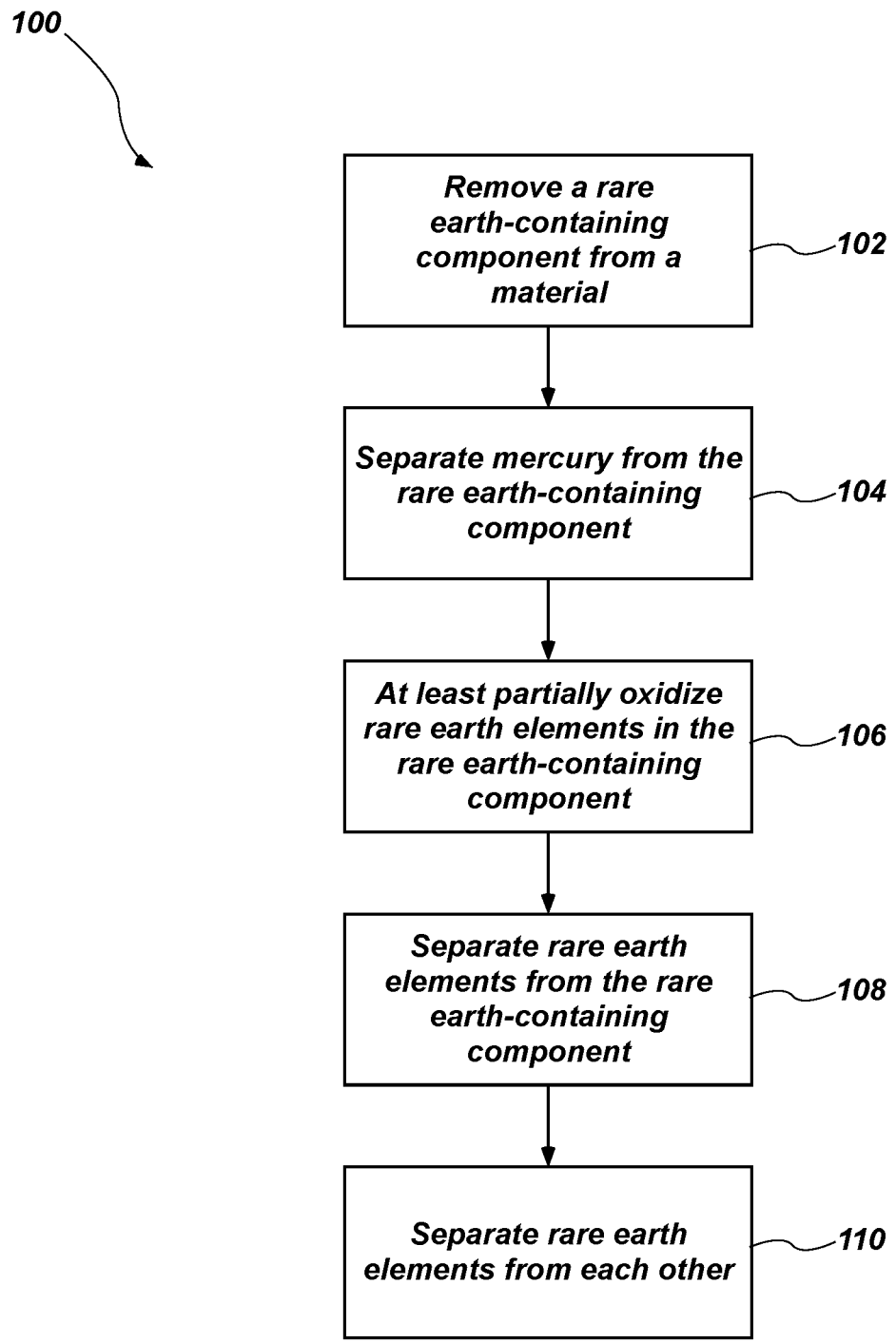
FIG. 1 is a simplified block diagram of a method of removing rare earth elements from a rare earth-containing material and recovering substantially pure rare earth elements therefrom.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for recovering mercury and rare earth elements from a material. Only those process acts and structures necessary to understand the embodiments of the disclosure are described in detail below. Additional acts to form substantially purified rare earth elements or oxides thereof may be performed by conventional techniques. Also note, any drawings accompanying the present application are for illustrative purposes only, and are thus not drawn to scale. Additionally, elements common between figures may retain the same numerical designation.

According to methods described herein, a method of recovering substantially pure rare earth elements from materials including the rare earth elements is described. In some embodiments, the method includes separating a rare earth-containing component from other components of a rare earth-containing material. In some embodiments, phosphor powders may be separated from fluorescent lamps. Contaminants, such as mercury, may be removed from the rare earth-containing component. After removal of mercury therefrom, the rare earth-containing component, which includes a plurality of rare earth elements, may be at least partially oxidized to convert the rare earth elements to one or more of hydroxides or oxides thereof. In some embodiments, the at least partially oxidized rare earth elements may be dissolved with a solution comprising at least one acid, at least one ligand, or at least one acid and at least one ligand to form a rare earth-containing aqueous solution. The rare earth-containing aqueous solution may be contacted with a liquefied gas or a supercritical fluid to form a rare earth-laden fluid including the rare earth elements therein. In other embodiments, the rare earth-containing component may be directly contacted with the liquefied gas or the supercritical fluid. The liquefied gas or the supercritical fluid may include one or more of an acid adduct, a ligand, or a solvent modifier formulated to selectively extract rare earth elements from the rare earth-containing component or the rare earth-containing aqueous solution.

The rare earth elements may be recovered from the rare earth-laden fluid as individual components by selectively stripping rare earth elements therefrom, adsorbing the rare earth elements on one or more resin beds followed by stripping the adsorbed rare earth elements therefrom, or combinations thereof. In some embodiments, rare earth elements are selectively stripped from the rare earth-laden fluid with one or more solutions comprising one or more of at least one acid, at least one ligand, or at least one acid and at least one ligand in one or more liquid-liquid extraction stages. In other embodiments, the rare earth-laden fluid is passed over a resin bed and the rare earth elements are adsorbed by adsorbents within the resin bed. The rare earth elements adsorbed on the resin bed may be separated from each other by stripping individual rare earth elements therefrom with a solution comprising one or more of an aqueous solution, a liquefied gas, or a supercritical fluid including one or more of an acid, an acid adduct or a ligand.

As used herein, the term "supercritical fluid" means and includes a fluid at a temperature above a critical temperature and a pressure above a critical pressure of the respective fluid. For example, supercritical carbon dioxide may include carbon dioxide at a temperature above about 31.1° C. and a pressure above about 7.39 MPa. Supercritical fluids described herein may include carbon dioxide, ammonia, methanol, ethanol, isopropanol, acetone, toluene, sulfur hexafluoride, propane, butane, pentane, trifluoromethane (R-23), 1,1,1,2-tetrafluoroethane (R-134a), R-404A, R-407C, R-410A, R-417A, R-422A, R-422B, R-422D, R-507, R-508B, other fluorocarbon or hydrocarbon refrigerants, or combinations thereof.

As used herein, the term "liquefied gas" means and includes materials in a predominately liquid phase, wherein such materials exist in a predominately gaseous phase at standard temperature and pressure (e.g., room temperature (about 20° C.) and atmospheric pressure (about 101.3 kPa)). Liquefied gases may be exposed to temperatures and pressures such that the materials are predominately in a liquid phase. Liquefied gases described herein may include liquid carbon dioxide, liquid ammonia, liquid propane, liquid butane, liquid ethylene, liquid propylene, another liquefied gas, or combinations thereof.

FIG. 1 is a simplified flow diagram of a method 100 of recovering mercury and rare earth elements from a material including rare earth elements, according to embodiments of the disclosure. The method 100 includes act 102 including removing a rare earth-containing component from a material; act 104 including separating mercury from the rare earth-containing component; act 106 including at least partially oxidizing the rare earth elements in the rare earth-containing component; act 108 including separating the rare earth elements from the rare earth-containing component; and act 110 including separating rare earth elements from each other.

Act 102 includes removing a rare earth-containing component from a material comprising the rare earth-containing component. By way of nonlimiting example, the material may comprise one or more of a solid oxide fuel cell electrolyte, a catalyst material, phosphors, ores containing rare earth elements, mining slag, rare earth-containing magnets, magnetic shavings (also referred to as "magnetic swarf"), ash, fly ash, incinerator ash, light emitting diodes (LEDs), end-of-life consumer electronics (e.g., shredded circuit boards, capacitors, sensors, etc.), batteries, rare earth-containing ceramic materials, optics polishing compounds, pigments, coatings, or any other material including one or more rare earth elements.

In some embodiments, such as where the rare earth-containing material comprises phosphor powder, act 102 includes disposing a plurality of used fluorescent lamps in an ultrasonic bath substantially filled with an acoustic medium. The acoustic medium may include water, liquid carbon dioxide, or another acoustic medium configured to propagate acoustic energy. In embodiments where the acoustic medium comprises liquid carbon dioxide, the acoustic medium may be maintained at a pressure such that the carbon dioxide is a liquid (for example, at about 18° C., the acoustic medium may be maintained at a pressure greater than about 6.0 MPa, such as greater than about 10 MPa, greater than about 15 MPa, greater than about 20 MPa, or greater than about 21 MPa). The acoustic medium may contact the phosphor powder within the fluorescent lamps. In some embodiments, at least one end of the fluorescent lamps may be open. In other embodiments, the fluorescent lamps are crushed prior to being disposed in the ultrasonic bath.

The ultrasonic bath may include a sonicator configured to provide acoustic energy (e.g., electromagnetic radiation at ultrasonic frequencies) to the acoustic medium. The acoustic medium may be configured to propagate the acoustic energy to the fluorescent lamps disposed in the ultrasonic bath. Responsive to exposure to the acoustic energy, substantially all of the phosphor powder may be liberated from glass surfaces of the fluorescent lamps.

In some embodiments, the ultrasonic bath may include a screen positioned and configured to separate glass components from the phosphor powder. The screen may comprise a mesh sized and configured to allow the acoustic medium and the phosphor powder dissolved in the acoustic medium to pass therethrough while retaining the glass. In some such embodiments, a bottom portion of the ultrasonic bath may include the phosphor powder while an upper portion (i.e., a portion above the screen) may include the glass components substantially free of phosphor powder.

In some embodiments, the rare earth-containing component (e.g., the phosphor powder) may include, among other things, a plurality of different rare earth elements and mercury. Act 104 includes separating any mercury that may be present in the rare earth-containing component therefrom. In some embodiments, the rare earth-containing component may be exposed to one or more of an oxidizer or a metal chelating agent to solubilize and remove the mercury therefrom. Suitable oxidizers may include an aqueous solution of potassium iodide (KI) and iodine ($I_2$), or an aqueous solution of sodium hypochlorite (NaOCl).

In some embodiments, the rare earth-containing component is contacted with a solution comprising one or more ligands formulated and configured to form a mercury-ligand complex. The mercury-ligand complex may be contacted with a supercritical fluid or a liquefied gas to extract the mercury-ligand complex from the solution. In other embodiments, the rare earth-containing component may be directly contacted with a supercritical fluid or a liquefied gas comprising the ligand to selectively extract the mercury from the rare earth-containing component and form a mercury-ligand complex. In some embodiments, the supercritical fluid comprises supercritical carbon dioxide. The liquefied gas may comprise liquid carbon dioxide.

Suitable metal chelating agents configured and formulated to extract mercury from the rare earth-containing component may include bis(2,4,4-trimethylpentyl)monothiophosphinic acid (such as that sold under the tradename CYANEX® 302, by Cytec Industries Inc., of Woodland Park, N.J.), bis(2,4,4-trimethylpentyl)dithiophosphinic acid (such as that sold under the tradename CYANEX® 301 by Cytec Industries Inc.), liquid phosphine oxides (such as those sold under the tradename CYANEX® 923 by Cytec Industries, Inc.), bis(trifluoroethyl) dithiocarbamate, diethyldithiocarbamate, bis-2-ethylhexyl sulphoxide, 2-ethyl-2 (isobutylthiomethyl)butane thiol, 3,3-diethylthietane, 3,3-dibutylthietane, triethylmonothiophosphate, tri-n-butylmonothiophosphate, trioctylmonothiophosphate, tributylphosphine sulfide, trioctylphosphine sulfide, triisobutylphosphine sulfide (such as that sold under the tradename CYANEX® 471X by Cytec Industries, Inc.), dibutyl thiophosphite, dibutyldithiophosphate, dibutyl 2-hydroxypropylthiophosphonate, dibutyl phosphinyl S-methyl dithioformate, diethyldithiophosphate, di(2-ethylhexyl)dithiophosphoric acid, trioctylphosphine oxide (TOPO), tributyl phosphate (TBP), octyl(phenyl)N,N-dii sobutylcarbamoylmethyl phosphine oxide (CMPO), bis(2-ethylhexyl)amine, trioctylamine, octylaniline, a quaternary ammonium salt (e.g., Aliquat 336), 7-(4-ethyl-1-methyloctyl)-8-quinolinol (also known as Kelex 100), 8-(alkarylsulfonoamido)quinolone (e.g., LIX 34), nonylthiourea, dodecylthiourea, benzylthiourea, dinonylthiourea, dioctylthiourea, p-tert-butylcalix[4]arene, p-tert-butyltertmercaptocalix[4]arene, or combinations thereof. After exposing the rare earth-containing component to the oxidizer or the metal chelating agent, the rare earth-containing component may be substantially free of mercury.

In other embodiments, the mercury may be removed from the rare earth-containing component by heating the rare earth-containing component. In some such embodiments, the rare earth-containing component may be exposed to a temperature between about 500° C. and about 650° C. in a mercury vacuum retort system to substantially remove all of the mercury therefrom.

The mercury may be recovered from the supercritical fluid or the liquefied gas by absorbing the mercury on a resin bed, decompressing the solution, and recovering precipitated mercury therefrom, or by other methods of recovering mercury from a solution. By way of nonlimiting example, the solution may be contacted by a resin bed comprising one or more ligands formulated and configured to strip the dissolved mercury therefrom. In other embodiments, the solution may be decompressed (e.g., a density of the solution may be reduced by lowering a pressure thereof, lowering a temperature thereof, or both) and the mercury may be precipitated therefrom as a mercury chelate.

Although act 102 and act 104 have been described as being performed in separate process acts, in some embodiments, act 102 and act 104 may be performed substantially simultaneously. In some such embodiments, the mercury may be removed from the rare earth-containing component substantially simultaneously with separation of the rare earth-containing component from the material. By way of nonlimiting example, where the rare earth-containing material comprises phosphor powder, the rare earth-containing material may be disposed in an ultrasonic bath comprising the acoustic medium. In some such embodiments, one or more of the oxidizer or the metal chelating agent may be added to the ultrasonic bath during sonication to extract substantially all of the mercury from the phosphor powder into the oxidizer or the metal chelating agent while substantially simultaneously separating the phosphor powder from glass surfaces of the fluorescent lamps.

Figure 2A:
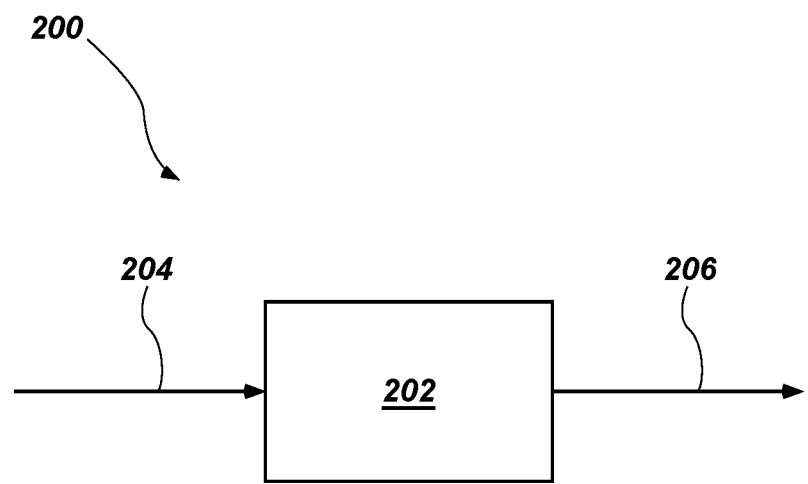
FIG. 2A is a simplified flow diagram illustrating a system for removing mercury from a rare earth-containing material and exposing the rare earth-containing material to an oxidizer, in accordance with embodiments of the disclosure.

The rare earth elements in the rare earth-containing component may be embedded in a crystalline matrix material of the rare earth-containing component. Accordingly, act 106 includes at least partially oxidizing the rare earth elements of the rare earth-containing component to facilitate removal of the rare earth elements therefrom. Referring to FIG. 2A, a simplified flow diagram of a system 200 for removing rare earth elements from the rare earth-containing component is illustrated. The system 200 may include a first vessel 202 in which the mercury-free rare earth-containing component may be disposed. The rare earth-containing component in the first vessel 202 may be exposed to an oxidizer 204 to form an at least partially oxidized rare earth-containing component 206. In some embodiments, the at least partially oxidized rare earth-containing component 206 comprises an at least partially oxidized phosphor powder. The oxidizer 204 may be formulated and configured to form hydroxides or oxides of the rare earth elements. By way of nonlimiting example, the oxidizer 204 may include sodium hydroxide (NaOH), sodium peroxide ($Na_2O_2$), or a combination thereof. In another embodiment, the rare earth-containing component may be oxidized by heating the rare earth-containing component in excess air or oxygen while exposing the rare earth-containing component to a temperature of about 500° C. In other embodiments, the rare earth-containing component may be exposed to an acid (e.g., nitric acid, hydrochloric acid, sulfuric acid, etc.) while being heated to alter an oxidation state of the rare earth elements in the rare earth-containing component.

Without wishing to be bound by any particular theory, it is believed that at least partially oxidizing the rare earth-containing component chemically alters a crystalline structure thereof and facilitates improved extraction of the rare earth elements therefrom during subsequent acts of the method 100.

Figure 2B:
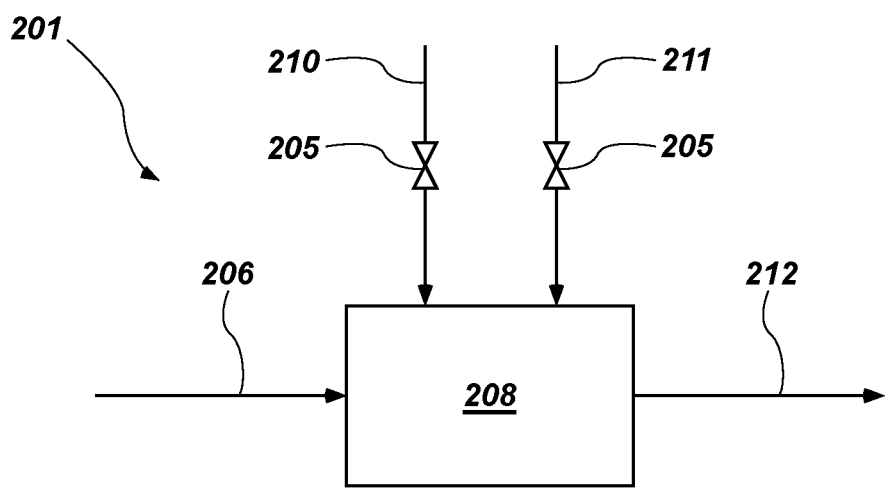
FIG. 2B is a simplified flow diagram of a system for removing rare earth elements from a rare earth-containing material, in accordance with embodiments of the disclosure.

Act 108 includes separating the rare earth elements from the mercury-free at least partially oxidized rare earth-containing component 206. FIG. 2B illustrates a system 201 for dissolving the rare earth elements from the at least partially oxidized rare earth-containing component 206, in accordance with some embodiments of the disclosure. The at least partially oxidized rare earth-containing component 206 may be introduced into a second vessel 208. A dissolution solution 210 formulated and configured to dissolve the rare earth elements from the at least partially oxidized rare earth-containing component 206 may be introduced into the second vessel 208 and contact the at least partially oxidized rare earth-containing component 206. The dissolution solution 210 may be used to extract substantially all of the rare earth elements from the at least partially oxidized rare earth-containing component 206 and form a solution comprising a plurality of dissolved rare earth elements (e.g., one or more of ions of yttrium (Y), lanthanum (La), Cerium (Ce), Neodymium (Nd), samarium (Sm), europium (Eu), Gadolinium (Gd), Terbium (Tb), Dysprosium (Dy), Erbium (Er), or other rare earth elements).

In some embodiments, the dissolution solution 210 may comprise an acid (e.g., nitric acid, hydrochloric acid, sulfuric acid, another acid, or combinations thereof), one or more ligands (e.g., diglycolamides, organophosphorus reagents, amines, or other ligands) (also referred to herein as "metal complexing ligands"), or a combination thereof. A concentration of the acid may be between about 1.0 M and about 15.0 M, although the disclosure is not so limited and the acid may have a different concentration. A concentration of the ligand in the dissolution solution 210 may be between about 0.1 mole percent and about 30.0 mole percent, depending on a solubility of the ligand in the dissolution solution 210.

In some embodiments, the dissolution solution 210 may remain in contact with the rare earth-containing component 206 for a predetermined period of time, such as for about 2 hours. A pressure of the second vessel 208 may be about atmospheric while the at least partially oxidized rare earth-containing component 206 is contacted with the dissolution solution 210. In some such embodiments, the second vessel 208 may be open to the atmosphere. In some embodiments, the dissolution solution 210 and the at least partially oxidized rare earth-containing component 206 may be exposed to a temperature between about room temperature (e.g., about 18° C.) and about 150° C. while the at least partially oxidized rare earth-containing component 206 is exposed to the dissolution solution 210. In some embodiments, the second vessel 208 may be sonicated while the rare earth-containing component is exposed to the dissolution solution 210.

After the predetermined period of time, the solution containing the plurality of dissolved rare earth elements may be contacted with a solvent solution 211 formulated and configured to remove the dissolved rare earth elements therefrom and form a rare earth-laden fluid 212. In some embodiments, the solution containing the plurality of rare earth elements may be contacted with the solvent solution 211 for about 2 hours. The solvent solution 211 may comprise a supercritical fluid or a liquefied gas. By way of nonlimiting example, the supercritical fluid may include carbon dioxide, ammonia, methanol, ethanol, isopropanol, acetone, toluene, sulfur hexafluoride, propane, butane, pentane, trifluoromethane (R-23), 1,1,1,2-tetrafluoroethane (R-134a), R-404A, R-407C, R-410A, R-417A, R-422A, R-422B, R-422D, R-507, R-508B, other fluorocarbon or hydrocarbon refrigerants, or combinations thereof. In some embodiments, the supercritical fluid may be a fluid (e.g., carbon dioxide) at a temperature between about 31.1° C. and about 850° C. and at a pressure between about 7.39 MPa and about 50 MPa. The liquefied gas may comprise liquid carbon dioxide, liquid ammonia, liquid propane, liquid butane, liquid ethylene, liquid propylene, another liquefied gas, or combinations thereof. A temperature and pressure of the second vessel 208 may be maintained such that the solvent solution 211 remains as a liquefied gas or a supercritical fluid in the second vessel 208.

The solvent solution 211 may be flowed through the second vessel 208 in batch mode wherein the solvent solution 211 remains in the second vessel 208 for a predetermined period of time prior to removal therefrom, the solvent solution 211 may be continuously flowed into and out of the second vessel 208, or a combination thereof. Stated another way, the second vessel 208 may be operated in a static mode, a dynamic mode, or a combination thereof. In some embodiments, the second vessel 208 may be sonicated while the solvent solution 211 is in the second vessel 208. The second vessel 208 may be operably coupled to one or more valves 205 to selectively control fluid flow (e.g., the dissolution solution 210, the solvent solution 211) to and from the second vessel 208.

In some embodiments, the solvent solution 211 may include one or more of solvent modifiers, ligands, acid adducts (e.g., an acid including one or more organic surfactants), other additives formulated and configured to selectively extract one or more of the dissolved rare earth elements, or combinations thereof entrained therein.

The acid adducts may include an adduct of tributyl phosphate with nitric acid (e.g., between about 4.0 M and about 8.0 M nitric acid) or an adduct of triisobutylamine and nitric acid (e.g., between about 4.0 M and about 8.0 M nitric acid). In other embodiments, the acid adduct includes one of tributyl phosphate or triisobutylamine with between about, for example, 4.0 M and about 8.0 M hydrochloric acid.

The ligands may include diglycolamides, organophosphorus reagents, amines, or other ligands. Nonlimiting examples of diglycolamides include N,N,N',N'-tetraoctyl diglycolamide (TODGA), N,N-di-2-ethylhexyl-N',N'-di-octyl diglycolamide (DEHDODGA), N,N,N',N'-tetra-2-ethylhexyl diglycolamide (TEHDGA), N,N-di-decyl-N',N'-di-hexyl diglycolamide (D(2)(DHDGA)), N,N-di-butyl-N',N'-di-dodecyl diglycolamide (DBD(3)(DGA)), N,N,N',N'-tetrahexyl diglycolamide (THDGA), N,N,N',N'-tetradecyl diglycolamide (TDDGA), N,N,N',N'-tetradodecyl diglycolamide (TdDDGA), N,N,N',N'-tetraamyl-3-oxapatanediamide (TADGA), N,N,N',N'-tetrapropyl-3-oxapantanediamide (TPDGA), N,N,N',N'-tetramethyldiglycolamide (TMDGA), N,N,N',N'-tetraethyl diglycolamide (TEDGA), N,N-dioctyl-diglycolamic acid (DODGAA), or combinations thereof.

Nonlimiting examples of ogranophosphorus reagents include liquid phosphine oxides (such as CYANEX® 923 by Cytec Industries, Inc.), CYANEX® 301, CYANEX® 302, a dialkyl phosphinic acid extractant (such as CYANEX® 272 by Cytec Industries, Inc.), other phosphorus-based chelating extractants (such as CYANEX® 572 by Cytec Industries, Inc.), 2-ethylhexyl hydrogen 2-ethylhexyl phosphonate (PC88A), octyl(phenyl)N,N-diisobutylcarbamoylmethyl phosphine oxide (CMPO), tetraamyl methylenediphosphonate (TAMDP), dioctyl N,N-diethylcarbamylphosphonate (DODECP), dihexyl N,N-dibutylcarbamylmethylenephosphonate (DHDBCMP), bis(2,2,4-trimethyl-1-pentyl) phosphinic acid, di(2-ethylhexyl) phosphoric acid (D2EHPA), bis-isodecyl phosphoric acid (DP-8R), bis-isostearyl phosphoric acid (DP10-R), di-n-butyl phosphoric acid (DBPA), di-n-amyl phosphoric acid (DAPA), di-n-octyl phosphoric acid (DOPA), diisoamyl phosphoric acid (DIAPA), trioctylphosphine oxide (TOPO), tributylphosphine oxide (TBPO), triisobutylphosphine oxide (TiBPO), tris(2-ethylhexyl)phosphine oxide, tributyl phosphate (TBP), or combinations thereof.

Nonlimiting examples of amines include a tri-octyl/decyl amine (such as, for example, Alamine 336), trioctylamine, bis(2-ethylhexyl)amine, tris(2-ethylhexyl)amine, tripentylamine, tributylamine, triisobutylamine, N,N,N',N',N'',N''-hexaalkyl-nitrilotriacetamide (NTAamide), N,N,N',N'-tetraethyl-3,6-dioxacoctane diamine (DOODA (C2)), N,N,N',N'-tetraoctyl-3,6-dioxaoctane diamide (DOODA (C8)), diethylenetriamine-N,N—N',N'',N''-pentaacetic acid (DTPA), or combinations thereof Nonlimiting examples of other ligands include 2,2-dimethyl-6,6,7,7,8,8-heptafluoro-3,5-octanedione (FOD), hexafluoroacetylacetone (HFAA), thenoyltrifluoroacetone (TTA), bis(trifluoroethyl) dithiocarbamate, diethyldithiocarbamate, N,N'-dimethyl-N,N'-dioctylhexylethoxymalonamide (DMDOHEMA), one or more β-diketones, or combinations thereof.

By way of nonlimiting example, the solvent modifiers may include one or more of at least one surfactant, at least one alcohol, at least one alkane, at least one carboxylic acid, at least one amine, or at least another material formulated and configured to modify one or more properties of the solvent solution 211.

With continued reference to FIG. 2B, exposing the solution comprising the dissolved rare earth elements to the solvent solution 211 may form the rare earth-laden fluid 212. The rare earth-laden fluid 212 may comprise the solvent solution 211 (e.g., a supercritical fluid or a liquefied gas), any solvent modifiers, ligands, or acid adducts dissolved therein, and any dissolved rare earth elements. In some embodiments, the dissolved rare earth elements may be in the form of rare earth element-ligand complexes. Individual rare earth elements may be recovered and purified from the rare earth-laden fluid 212, as will be described herein with reference to FIG. 3A, FIG. 3B, FIG. 4A, FIG. 4B, and FIG. 5. The rare earth-containing component may remain dissolved in the dissolution solution 210. In some embodiments, precious metals and other metals (e.g., gold, silver, platinum, palladium, copper, tin, etc.) may be recovered from the dissolution solution 210 by one or more known methods.

Figure 2C:
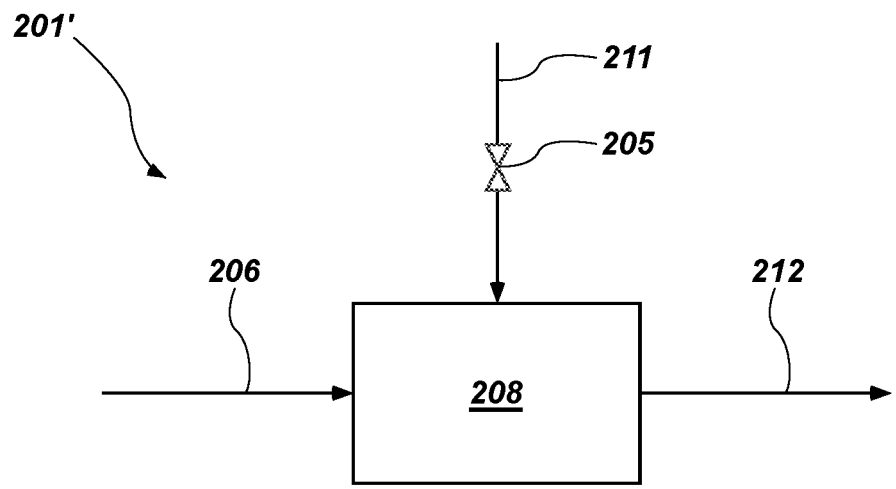
FIG. 2C is a simplified flow diagram of a system for removing rare earth elements from a rare earth-containing material, in accordance with other embodiments of the disclosure.

In other embodiments, the rare earth elements may be extracted from the at least partially oxidized rare earth-containing component 206 by direct dissolution. FIG. 2C illustrates another embodiment of a system 201' for forming the rare earth-laden fluid 212. The at least partially oxidized rare earth-containing component 206 may be exposed directly to the solvent solution 211. Stated another way, the at least partially oxidized rare earth-containing component 206 may be exposed to the solvent solution 211 without exposing the rare earth-containing component 206 to the dissolution solution 210 (FIG. 2B). The at least partially oxidized rare earth-containing component 206 may be disposed in the second vessel 208 and directly exposed to the solvent solution 211. The solvent solution 211 may include the supercritical fluid or the liquefied gas and may include one or more of an acid adduct (an acid and an organic surfactant), ligands, or solvent modifiers, as described above with reference to FIG. 2B. The second vessel 208 may be maintained at a temperature and pressure such that the liquefied gas or the supercritical fluid remain as such. The solvent solution 211 may be flowed through the second vessel 208 in batch mode wherein the solvent solution 211 remains in the second vessel 208 for a predetermined period of time prior to removal therefrom, the solvent solution 211 may be continuously flowed into and out of the second vessel 208, or a combination thereof. Stated another way, the second vessel 208 may be operated in a static mode, a dynamic mode, or a combination thereof. In some embodiments, the at least partially oxidized rare earth-containing component 206 is exposed to the solvent solution 211 for about 2 hours. The second vessel 208 may be sonicated while the rare earth-containing component is exposed to the solvent solution 211. In some embodiments, the rare earth-containing component may comprise a solid material (e.g., phosphor powder). The solid material may be substantially free of mercury and rare earth elements after acts 104, 106, and 108. In other words, the rare earth-containing component may not be dissolved in a solution (e.g., the dissolution solution 210 (FIG. 2B)), which may facilitate ease of disposal of the solid material stripped of mercury and rare earth elements.

Although FIG. 2A through FIG. 2C illustrate that the second vessel 208 is separate from the first vessel 202, the disclosure is not so limited and the rare earth elements may be removed from the at least partially oxidized rare earth-containing component 206 in the first vessel 202. In some such embodiments, the oxidizer 204 may be removed from the first vessel 202 prior to exposing the at least partially oxidized rare earth-containing component 206 to one or more of the dissolution solution 210 or the solvent solution 211.

With reference again to FIG. 1, act 110 includes separating the different rare earth elements dissolved in the rare earth-laden fluid 212 from each other to form individual fractions of the different rare earth elements.

Figure 3A:
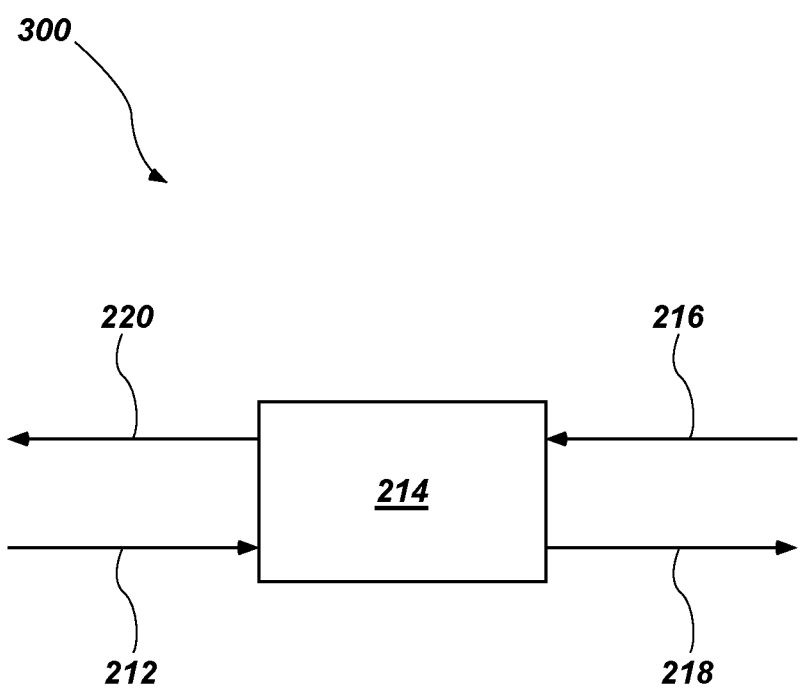
FIG. 3A is a simplified flow diagram of a system for stripping rare earth elements from a fluid including the rare earth elements by counter current extraction, in accordance with embodiments of the disclosure.

Referring to FIG. 3A, a system 300 for stripping the rare earth elements from the rare earth-laden fluid 212 with a stripping solution 216 in a liquid-liquid extraction cell 214 is illustrated. The stripping solution 216 may comprise at least one acid, at least one ligand, or a combination thereof (i.e., at least one acid and at least one ligand). In some embodiments, the at least one acid, the at least one ligand, or both may be dissolved in a supercritical fluid or a liquefied gas. By way of nonlimiting example, the stripping solution 216 may include nitric acid, hydrochloric acid, aqua regia (e.g., 3 parts HCl to 1 part $HNO_3$), or combinations thereof. The stripping solution 216 may have a concentration of about 8.0 M or greater, such as between about 8.0 M and about 10.0 M. In other embodiments, the stripping solution 216 may include one or more ligands, such as one or more of the diglycolamides, organophosphorus reagents, amines, or other ligands described above. In some embodiments, the stripping solution 216 comprises a diglycolamide.

The liquid-liquid extraction cell 214 may be configured to facilitate extraction of the rare earth elements from the rare earth-laden fluid 212 to form a rare earth-laden aqueous acid solution 220. Stripping rare earth elements from the rare earth-laden supercritical fluid 212 with the stripping solution 216 may form a substantially pure fluid 218. In some embodiments, at least a portion of the substantially pure fluid 218 may be recycled back to the dissolution solution 210 (FIG. 2).

In some embodiments, the liquid-liquid extraction cell 214 may be operated at a temperature and pressure such that the rare earth-laden fluid 212 remains as a liquefied gas or a supercritical fluid (depending on the solvent solution 211 (FIG. 2A and FIG. 2B)). In some embodiments, the rare earth-laden fluid 212 comprises one of a supercritical fluid or a liquefied gas and the stripping solution 216 comprises another of a supercritical fluid or the liquefied gas. The stripping solution 216 may be selected such that the stripping solution comprises a supercritical fluid or a liquefied gas at a temperature and pressure that the rare earth-laden fluid 212 comprises a supercritical fluid or a liquefied gas. In other embodiments, the stripping solution 216 and the rare earth-laden fluid 212 both comprise a supercritical fluid or a liquefied gas, which may be the same or may be different.

The rare earth elements dissolved in the rare earth-laden aqueous acid solution 220 may be recovered as individual components by methods such as ion exchange, solvent extraction (such as with di-2-ethylehexyl orthophosphoric acid (HDEHP) and hydrochloric acid), fractional crystallization, or precipitation.

Figure 3B:
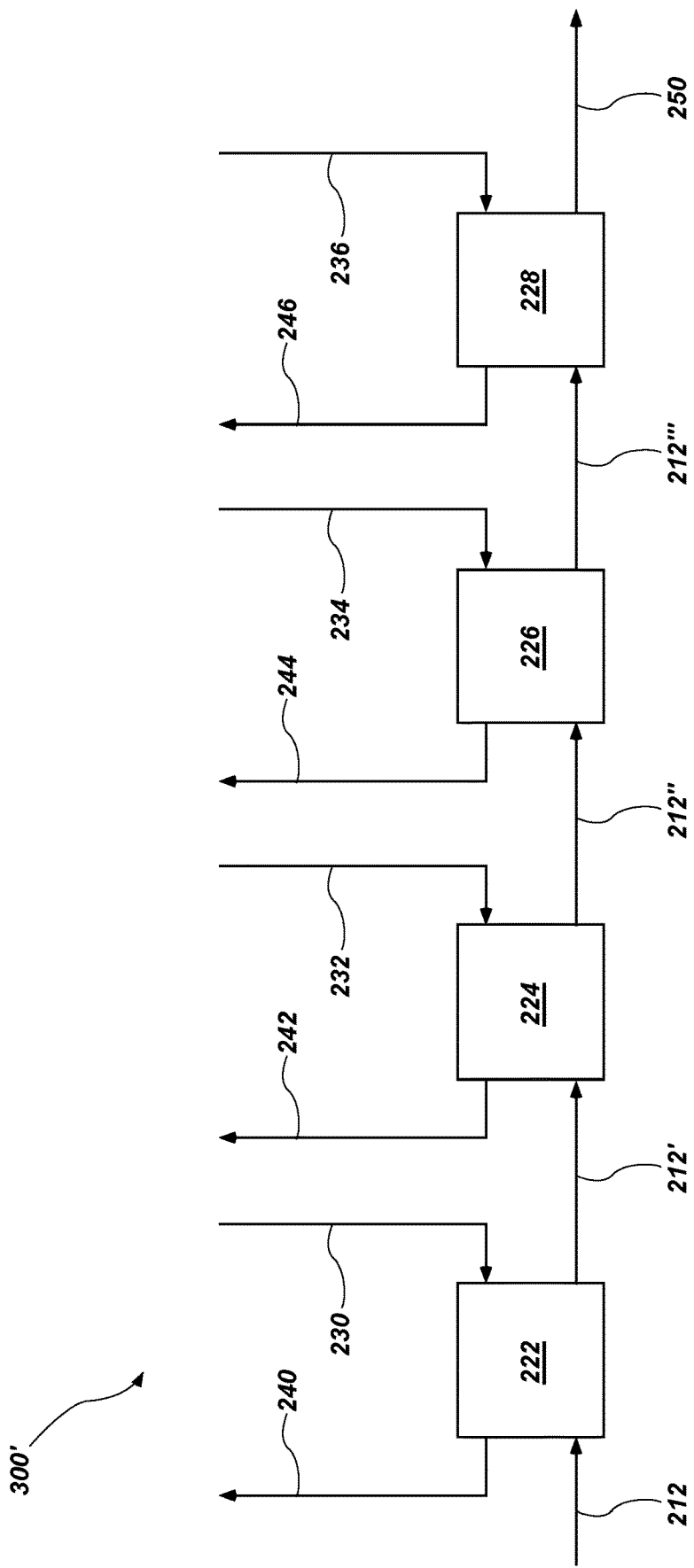
FIG. 3B is a simplified flow diagram of another system for stripping rare earth elements from a fluid including the rare earth elements by counter current extraction, in accordance with other embodiments of the disclosure.

Referring to FIG. 3B, another system 300' for recovering the rare earth elements from the rare earth-laden fluid 212 is described. The system 300' includes a plurality of counter current liquid-liquid extraction stages including, for example, a first stage 222, a second stage 224, a third stage 226, and a fourth stage 228. Although only four stages are shown in the system 300' of FIG. 3B, the system 300' may include fewer stages (e.g., two stages, three stages) or more stages (e.g., five stages, six stages, etc.). In some embodiments, if the rare earth-laden fluid 212 includes n different types of rare earth elements dissolved therein, the system 300' may include at least n–1 stages to form n different solutions, each solution including a different rare earth element dissolved therein than the other solutions.

The rare earth-laden fluid 212 may be introduced counter current to a first stripping solution 230 in the first stage 222. The first stripping solution 230 may be formulated and configured to remove at least a first rare earth element from the rare earth-laden fluid 212 to form a first rare earth-containing solution 240 and a second rare earth-laden fluid 212' including at least one less rare earth element dissolved therein than the rare earth-laden fluid 212 entering the first stage 222. In some embodiments, the first stripping solution 230 may be substantially similar to the stripping solution 216 described above with reference to FIG. 3A. The first rare earth-containing solution 240 may include at least one rare earth element dissolved therein.

The second rare earth-laden fluid 212' may enter the second stage 224 and flow counter current to a second stripping solution 232 formulated and configured to absorb at least a second rare earth element from the second rare earth-laden fluid 212' and form a second rare earth-containing solution 242 including the at least a second rare earth element dissolved therein. A third rare earth-laden fluid 212" exiting the second stage 224 may include at least one less rare earth element therein than the second rare earth-laden fluid 212'.

At least another rare earth element may be removed from the third rare earth-laden fluid 212" in the third stage 226 with a third stripping solution 234 to form a third rare earth-containing solution 244 in substantially the same manner as described above with reference to the first stage 222 and the second stage 224.

A fourth rare earth-laden fluid 212'" from the third stage 226 may include at least one less rare earth element than the third rare earth-laden fluid 212". At least another rare earth element may be removed from the fourth rare earth-laden fluid 212'" in the fourth stage 228 with a fourth stripping solution 236 to form a fourth rare earth-containing solution 246 in substantially the same manner as described above with reference to the first stage 222, the second stage 224, and the third stage 226. A substantially pure fluid 250 may exit the fourth stage 228. The substantially pure fluid 250 may be substantially free of dissolved rare earth elements. In some embodiments, the substantially pure fluid 250 may be recycled back to the dissolution solution 210 (FIG. 2).

Accordingly, individual rare earth elements may be removed from the rare earth-laden fluid 212, 212', 212", 212'" at each stage of the system 300' and may be dissolved in each of the respective rare earth-containing solutions 240, 242, 244, 246. The stripping solutions 230, 232, 234, 236 at each stage may be formulated and configured to selectively extract at least one rare earth element from the rare earth-laden fluid in the respective stage. The stripping solution at each stage may comprise at least one acid, at least one ligand, or a combination thereof and may be similar to the stripping solutions 216 described above with reference to FIG. 3A. The stripping solutions may include the acid, the ligand, or both dissolved in a supercritical fluid or a liquefied gas. In some embodiments, the stripping solution at each stage may be different than the stripping solution at the other stages.

In some embodiments, the stripping solution at each stage may comprise an acid having a greater strength than an acid of the stripping solution in a previous stage. In some embodiments, each of the first stripping solution 230, the second stripping solution 232, the third stripping solution 234, and the fourth stripping solution 236 may comprise nitric acid or hydrochloric acid having a different concentration (e.g., increasing concentrations from the first stage 222 to the fourth stage 228). By way of nonlimiting example, the first stripping solution 230 may comprise one of nitric acid or hydrochloric acid having a concentration between about 0.5 M and about 2.0M, the second stripping solution 232 may comprise one of nitric acid or hydrochloric acid having a concentration between about 2.0 M and about 4.0 M, the third stripping solution 234 may comprise one of nitric acid or hydrochloric acid having a concentration between about 4.0 M and about 6.0 M, and the fourth stripping solution 236 may comprise one of nitric acid or hydrochloric acid having a concentration between about 6.0 M and about 8.0 M.

In other embodiments, the first stripping solution 230 may comprise a first ligand formulated and configured to selectively strip a first rare earth element from the rare earth-laden fluid 212, the second stripping solution 232 may comprise a second ligand formulated and configured to selectively strip a second rare earth element from the second rare earth-laden fluid 212', the third stripping solution 234 may comprise a third ligand formulated and configured to selectively strip a third rare earth element from the third rare earth-laden fluid 212''', and the fourth stripping solution 236 may comprise a fourth ligand formulated and configured to selectively strip a fourth rare earth element from the fourth rare earth-laden fluid 212'''. In yet other embodiments, at least some of the stripping solutions may comprise an acid and at least some other of the stripping solutions may comprise a ligand.

In some embodiments, the stages may be operated at a temperature and pressure such that the rare earth-laden fluid 212 remains as a liquefied gas or a supercritical fluid (depending on the solvent solution 211 (FIG. 2A and FIG. 2B)). In some embodiments, the stripping solutions may comprise a supercritical fluid or a liquefied gas and may comprise the same material or a different material than the rare earth-laden fluid 212. In some embodiments, the rare earth-laden fluid 212 comprises one of a supercritical fluid or a liquefied gas and the stripping solutions comprise another of a supercritical fluid or the liquefied gas. The stripping solutions may be selected such that the stripping solutions comprise a supercritical fluid or a liquefied gas at a temperature and pressure that the rare earth-laden fluid 212 comprises a supercritical fluid or a liquefied gas. In other embodiments, the stripping solutions and the rare earth-laden fluid 212 both comprise a supercritical fluid or a liquefied gas, which may be the same or may be different.

Rare earth elements that are dissolved in each of the first rare earth-containing solution 240, the second rare earth-containing solution 242, the third rare earth-containing solution 244, and the fourth rare earth-containing solution 246 may depend at least in part on the type of ligands or acid adducts that are in the rare earth-laden fluid 212. By way of nonlimiting example only, if the rare earth-laden fluid 212 includes a trioctylphosphine oxide (TOPO) ligand, heavier rare earth elements (e.g., those having a higher atomic weight or a higher density) may be dissolved in acid solutions having a lower strength. In some such embodiments, the rare earth elements may be stripped from the rare earth-laden fluid 212 in the following order: erbium, dysprosium, terbium, gadolinium, europium, samarium, neodymium, cerium, lanthanum, and yttrium.

Rare earth elements in each of the first rare earth-containing solution 240, the second rare earth-containing solution 242, the third rare earth-containing solution 244, and the fourth rare earth-containing solution 246 may be stored separately as lanthanide nitrates or lanthanide chlorides of the rare earth elements, depending on the dissolution solution 210 (FIG. 2B) with which the rare earth elements were extracted, or the acid adducts in the solvent solution 211 (FIG. 2B, FIG. 2C). In some embodiments, the individual rare earth elements are stored in solution. In other embodiments, the rare earth elements are precipitated to form a lanthanide oxide of the rare earth element and may be stored as an oxide.

Figure 4A:
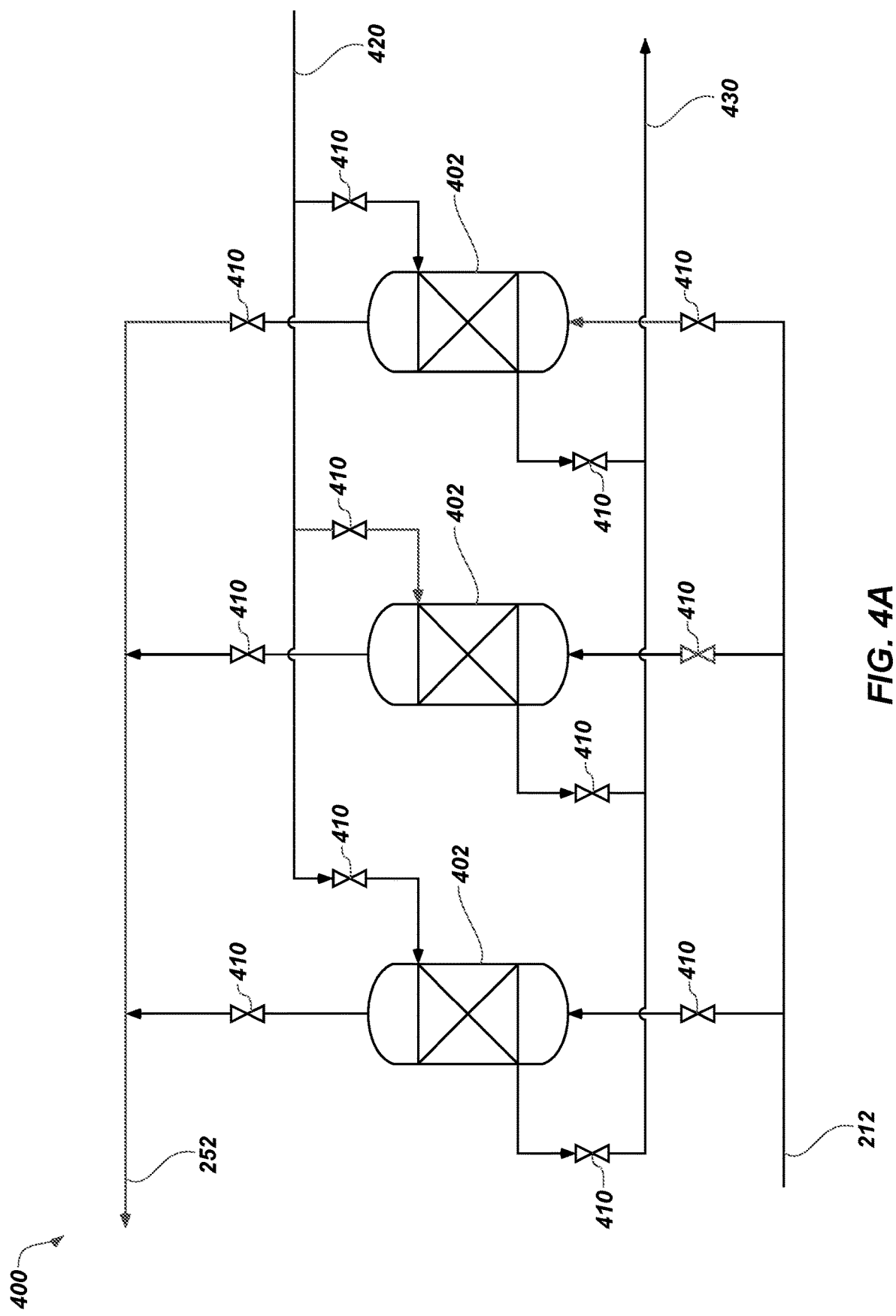
FIG. 4A is a simplified flow diagram of a system including a plurality of resin beds for removing rare earth elements from a fluid including the rare earth elements, in accordance with embodiments of the disclosure.

In yet other embodiments, the rare earth-laden fluid 212 may be purified by loading the rare earth elements onto a resin bed. Referring to FIG. 4A, a system 400 for loading a plurality of resin beds 402 with the rare earth elements of the rare earth-laden fluid 212 is illustrated. The system 400 may include, for example, three resin beds, although the disclosure is not so limited and the system 400 may include only one resin bed, two resin beds, or more than three resin beds. Each of the resin beds 402 may include an adsorbent formulated and configured (i.e., functionalized) to adsorb substantially all of the rare earth elements of the rare earth-laden fluid 212. Stated another way, the adsorbent may be substantially non-selective to the rare earth elements dissolved in the rare earth-laden fluid 212. By way of nonlimiting example, the adsorbent may include C8 packing, C18 packing, silicon dioxide (i.e., silica) packing, zeolite packing, other packing materials commonly used in the high performance liquid chromatography (HPLC) industry, or combinations thereof.

The resin beds 402 may be configured to be in fluid communication with the rare earth-laden fluid 212 through one or more valves 410. Accordingly, the rare earth-laden fluid 212 may flow through at least one of a first resin bed 402, a second resin bed 402, or a third resin bed 402 to substantially load the adsorbent of the respective resin bed 402 with the rare earth elements dissolved in the rare earth-laden fluid 212. After passing through a resin bed 402, substantially all of the rare earth elements in the rare earth-laden fluid 212 may be adsorbed onto the adsorbents within the resin bed 402, forming a substantially pure fluid 252. The substantially pure fluid 252 may be recycled back to the solvent solution 211 (FIG. 2B, FIG. 2C).

The rare earth elements may be selectively stripped (e.g., removed) from the loaded resin beds 402 to recover individual rare earth elements therefrom. Each of the resin beds 402 may be configured to be in fluid communication with a stripping solution 420, which may be formulated and configured to selectively strip one or more rare earth elements adsorbed on the resin bed 402. The stripping solution 420 may be introduced into at least one of the resin beds 402 loaded with the rare earth elements to selectively strip at least one of the rare earth elements from the resin bed 402. A substantially pure rare earth element solution 430 may exit each of the resin beds 402. The substantially pure rare earth element solution 430 may be stored as a solution or the substantially pure rare earth element solution 430 may be precipitated as an oxide for storage.

The stripping solution 420 may include an aqueous acid solution (e.g., nitric acid, hydrochloric acid, sulfuric acid, etc.), an aqueous solution including one or more ligands, or an organic acid adduct in one of a supercritical fluid, such as supercritical carbon dioxide, or a liquefied gas. The organic acid adduct may comprise, for example, tributyl phosphate with nitric acid or triisobutylamine with nitric acid. In other embodiments, the organic acid adduct may include tributyl phosphate with hydrochloric acid or triisobutylamine with hydrochloric acid. The acid adduct may include between about 0.1 M and about 8.0 M of the acid (nitric acid or hydrochloric acid). A concentration of the acid may be adjusted to selectively strip different rare earth elements from the at least one resin bed 402. By way of nonlimiting example, a first rare earth element may be stripped from a loaded resin bed 402 at an acid concentration of about 0.1 M to form a substantially pure rare earth element solution 430 having at least a first type of rare earth element dissolved therein. After removing the first rare earth element from the resin bed 402, at least a second rare earth element may be stripped from the resin bed 402 at another, higher, concentration of the acid to form a substantially pure rare earth element solution 430 having at least a second type of rare earth element dissolved therein. After removing the second rare earth element from the resin bed 402, at least a third rare earth element may be stripped from the resin bed 402 at yet another, higher concentration of the acid to form a substantially pure rare earth element solution 430 having at least a third type of rare earth element dissolved therein. Accordingly, substantially purified rare earth elements may be dissolved in a substantially pure rare earth element solution 430.

In other embodiments, the stripping solution 420 may include at least one ligand formulated and configured to selectively strip at least a first rare earth element from the resin bed 402. The at least one ligand may comprise a part of an aqueous solution, may be dissolved in a gaseous liquid, or may be dissolved in a supercritical fluid. The at least one ligand may include any of the diglycolamide ligands, organophosphorus reagent ligands, amine ligands, or other ligands described above. A concentration of the ligand may be adjusted to selectively remove the rare earth elements from the resin bed 402.

In yet other embodiments, the stripping solution 420 may be substantially similar to the stripping solution 216 described above with reference to FIG. 3A. In some such embodiments, the stripping solution 420 may comprise one or more of at least one acid, at least one ligand, or a combination thereof (i.e., at least one acid and at least one ligand).

In some embodiments, it is contemplated that at least one of the resin beds 402 may be in fluid communication with the rare earth-laden fluid 212 to adsorb the rare earth elements dissolved therein while at least another of the resin beds 402 is in fluid communication with the stripping solution 420 to selectively remove rare earth elements therefrom. In some such embodiments, rare earth elements from the rare earth-laden fluid 212 may be adsorbed onto one resin bed 402 while rare earth elements previously adsorbed onto at least another resin bed 402 are selectively stripped therefrom. In other words, at least one resin bed 402 may be regenerated while at least another resin bed 402 is loaded with rare earth elements.

Figure 4B:
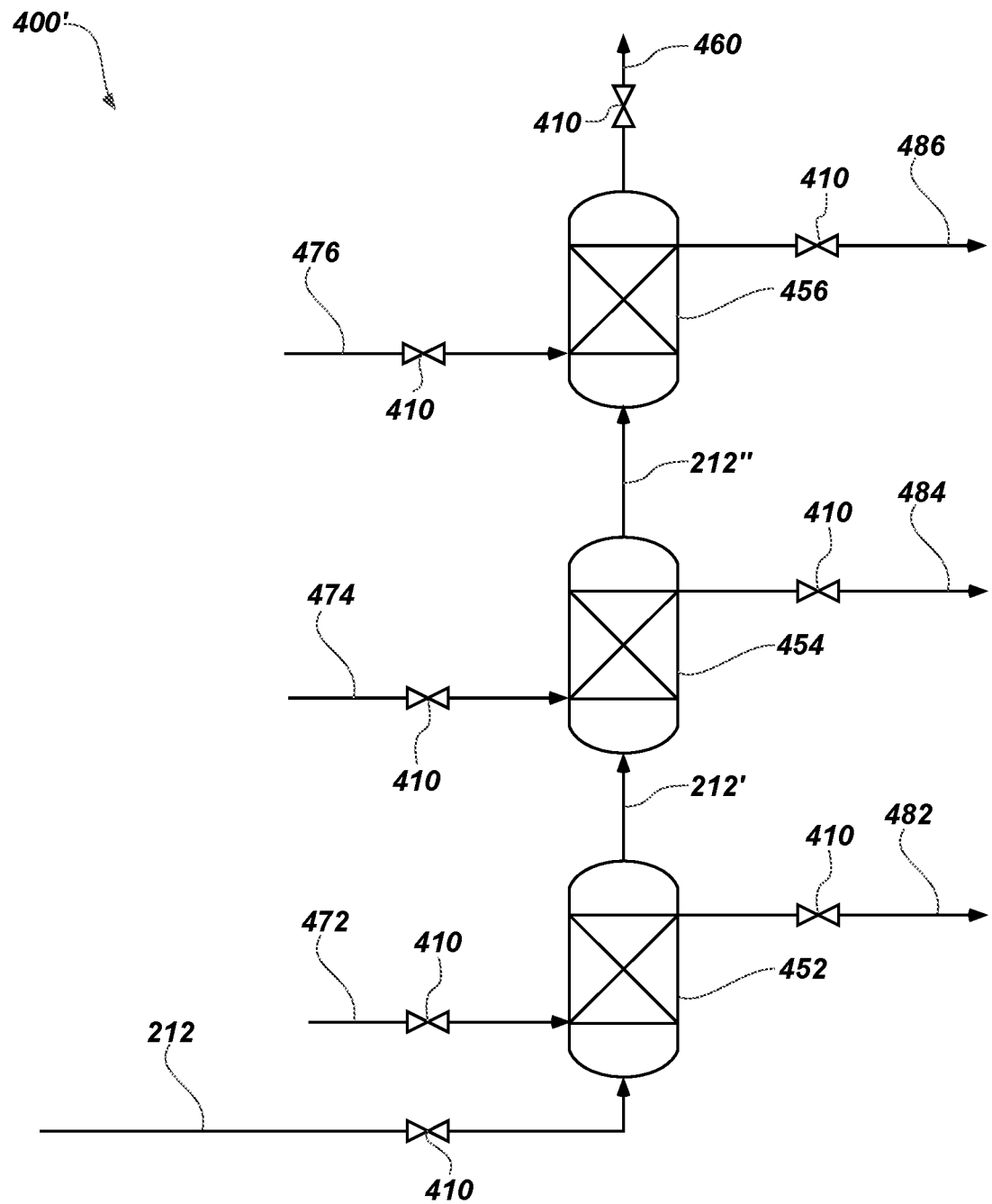
FIG. 4B is a simplified flow diagram of another system including a plurality of resin beds for removing rare earth elements from a fluid including the rare earth elements, in accordance with other embodiments of the disclosure.

In yet other embodiments, each of the resin beds 402 may include a different adsorbent therein, the adsorbent formulated and configured to selectively adsorb at least one of the rare earth elements of the rare earth-laden fluid 212. Referring to FIG. 4B, a system 400' including a plurality of resin beds is illustrated. The system 400' may include a first resin bed 452, a second resin bed 454, and at least a third resin bed 456, each of which may include an adsorbent formulated and configured to adsorb a different rare earth than an adsorbent within the other resin beds. In some embodiments, each of the first resin bed 452, the second resin bed 454, and the at least a third resin bed 456 may comprise a different adsorbent than the other of the first resin bed 452, the second resin bed 454, and the at least a third resin bed 456. Nonlimiting examples of the adsorbent may include those commercially available from Eichrom Technologies, LLC of Lisle, Ill., such as, for example Eichrome actinide resins, Eichrom rare earth resins, Eichrom lanthanide resins, Eichrom Lanthanide 2 resins, Eichrom Lanthanide 3 resins, Eichrom TEVA resins, Eichrom DGA normal resins, or Eichrom DGA branched resins. In yet other embodiments, the adsorbent may include an adsorbent functionalized with one or more of the diglycolamide ligands, organophosphorus reagent ligands, amine ligands, or other ligands described above.

The first resin bed 452, the second resin bed 454, and the at least a third resin bed 456 may be operably coupled in series. Stated another way, the system 400' may be configured such that the rare earth-laden fluid 212 flows sequentially from the first resin bed 452 to the second resin bed 454 and from the second resin bed 454 to the at least a third resin bed 456.

In use and operation, the rare earth-laden fluid 212 may flow through the first resin bed 452 which may adsorb at least a first rare earth element of the rare earth-laden fluid 212 to form a second rare earth-laden fluid 212'. The second rare earth-laden fluid 212' may flow through the second resin bed 454 wherein at least a second rare earth element within the second rare earth-laden fluid 212' is adsorbed to form at least a third rare earth-laden fluid 212". The at least a third rare earth-laden fluid 212" may flow through the at least a third resin bed 456, which may be formulated and configured to adsorb at least a third rare earth element from the third rare earth-laden fluid 212" and form a substantially pure fluid 460. At least a portion of the substantially pure fluid 460 may be recycled back to the solvent solution 211 (FIG. 2B, FIG. 2C).

After each of the resin beds are loaded with rare earth elements, the rare earth elements may be stripped from the resin beds to form substantially pure rare earth element solutions. For example, a first stripping solution 472 may be introduced into the first resin bed 452. The first stripping solution 472 may be formulated and configured to strip the rare earth elements that are adsorbed onto the adsorbent of the first resin bed 452 to form a first rare earth-containing solution 482. Similarly, a second stripping solution 474 and a third stripping solution 476 may flow through and contact the adsorbent in the second resin bed 454 and the at least a third resin bed 456, respectively, to form a respective second rare earth-containing solution 484 and at least a third rare earth-containing solution 486.

Each of the first stripping solution 472, the second stripping solution 474, and the at least a third stripping solution 476 may comprise an aqueous acid solution, such as nitric acid, hydrochloric acid, sulfuric acid, or combinations thereof, an aqueous solution including at least one ligand, an acid adduct (e.g., TBP and nitric acid), a supercritical fluid including a ligand or an acid adduct, a liquefied gas including a ligand or an acid adduct, or combinations thereof. In some embodiments, the stripping solutions may include the same material and may have different concentrations. In other embodiments, the stripping solutions comprise different materials. In some embodiments, the stripping solutions comprise the diglycolamide ligands, organophosphorus reagent ligands, amine ligands, or other ligands described above, the ligand having a concentration between about 0.1 mole percent and about 30.0 mole percent. In some embodiments, the ligands are dispersed in a supercritical fluid or a liquefied gas.

The rare earth-containing solutions may include different rare earth elements dissolved therein. Individual rare earth elements may be stored in solution or may be precipitated as an oxide for storage.

Although FIG. 4B illustrates only three resin beds, the present disclosure is not so limited and the system 400' may include any suitable number of resin beds. In some embodiments, the system 400' may include a number of resin beds equal to at least one fewer than a number of rare earth elements that are dissolved within the rare earth-laden supercritical fluid 212 or a number of rare earth elements to be separated.

Figure 5:
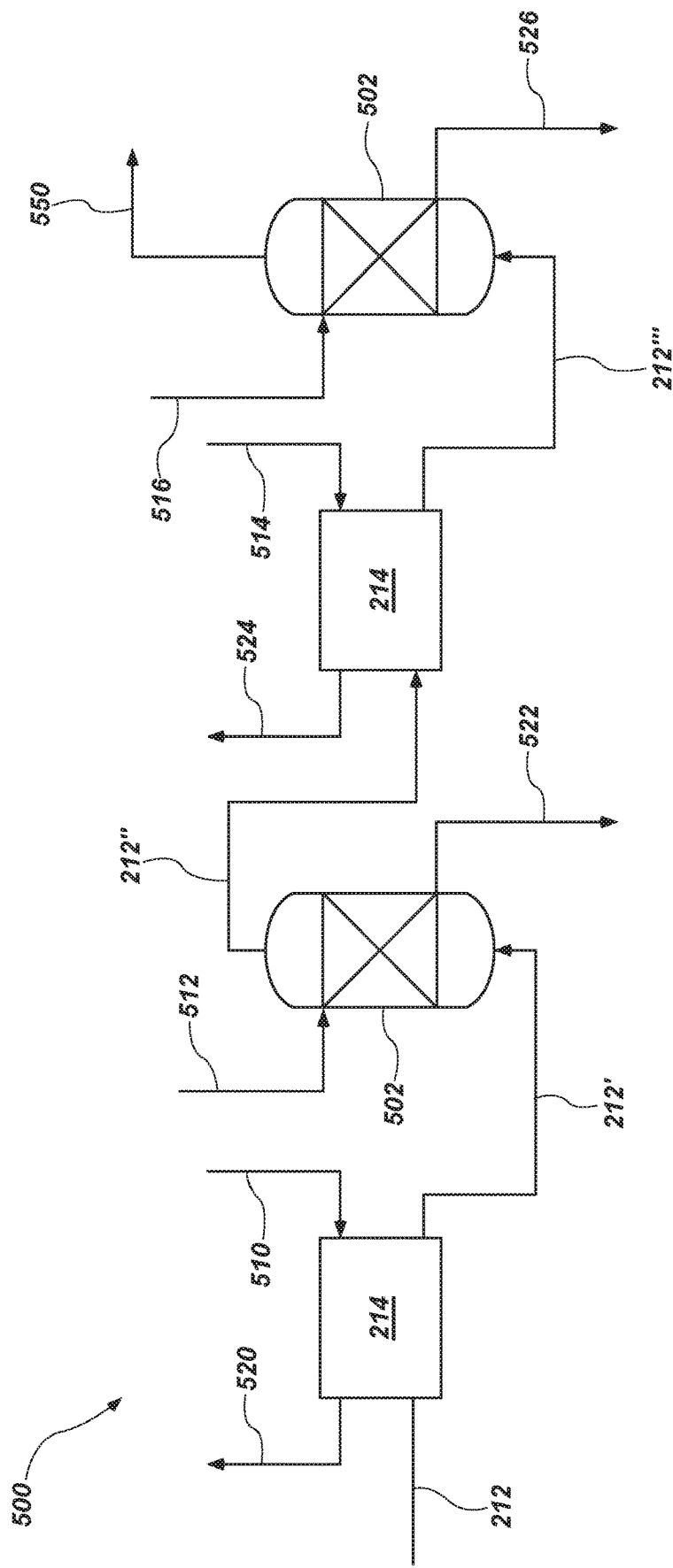
FIG. 5 is a simplified flow diagram of a system including a plurality of resin beds and a plurality of liquid-liquid extraction stages for removing rare earth elements from a fluid, in accordance with other embodiments of the disclosure.

In some embodiments, a system may include one or more of the liquid-liquid extraction cells 214, 222, 224, 226, 228 described above with reference to FIG. 3A and FIG. 3B and one or more of the resin beds 402, 452, 454, 456 described above with reference to FIG. 4A and FIG. 4B. As only one example, FIG. 5 is a system 500 including one or more liquid-liquid extraction cells 214 and one or more resin beds 502. The liquid-liquid extraction cells 214 may be substantially similar to the liquid-liquid extraction cells 214, 222, 224, 226, 228 described above with reference to FIG. 3A and FIG. 3B. The resin beds 502 may be substantially similar to one or more of the resin beds 402, 452, 454, or 456 described above with reference to FIG. 4A and FIG. 4B. In some embodiments, the rare earth-laden fluid 212 may flow into a first liquid-liquid extraction cell 214 countercurrent to a first stripping solution 510, which may be substantially similar to the stripping solution 216 or stripping solutions 230, 232, 234, 236 described above with reference to FIG. 3A and FIG. 3B. A second rare earth-laden fluid 212' may exit the liquid-liquid extraction cell 214 which may include one less rare earth element that the rare earth-laden fluid 212. A first rare earth-containing fluid 520 may include at least a first rare earth element removed from the rare earth-laden fluid 212 in the liquid-liquid extraction cell 214.

The second rare earth-laden fluid 212' may enter a first resin bed 502 that may include one or more adsorbents formulated and configured to adsorb at least one rare earth element from the second rare earth-laden fluid 212' to form a third rare earth-laden fluid 212" having at least one fewer rare earth element than the second rare earth-laden fluid 212'. A second stripping solution 512 may enter the first resin bed 502 and strip the at least one rare earth element therefrom to form a second rare earth-containing fluid 522.

The third rare earth-laden fluid 212" may flow into a second liquid-liquid extraction cell 214 countercurrent to a third stripping solution 514 to form a fourth rare earth-laden fluid 212''' having at least one less rare earth element than the third rare earth-laden fluid 212". The third stripping solution 514 may be substantially similar to the stripping solution 216 or stripping solutions 230, 232, 234, 236 described above with reference to FIG. 3A and FIG. 3B. A third rare earth-containing fluid 524 may exit the second liquid-liquid extraction cell 214.

The fourth rare earth-laden fluid 212''' may flow into a second resin bed 502 including one or more adsorbents formulated and configured to adsorb at least one rare earth element from the fourth rare earth-laden fluid 212''' to form a substantially pure fluid 550, which may be recycled back to the solvent solution 211 (FIG. 2B, FIG. 2C). The substantially pure fluid 550 may be substantially free of any rare earth elements. A fourth stripping solution 516 may enter the second resin bed 502 and strip the at least one rare earth element therefrom to form a fourth rare earth-containing fluid 526.

Although FIG. 5 illustrates that the rare earth-laden fluid 212 enters the first liquid-liquid extraction cell 214 prior to entering the resin beds 502, the disclosure is not so limited. It is contemplated that, in some embodiments, the rare earth-laden fluid 212 may enter one or more resin beds 502 prior to entering a liquid-liquid extraction cell 214. Similarly, although FIG. 5 illustrates one liquid-liquid extraction cell 214 between resin beds 502, in other embodiments, the system 500 may comprise any combination of liquid-liquid extraction cells 214 and resin beds 502 arranged in any configuration. In some embodiments, the resin beds 502 are arranged in a parallel configuration (such as that shown in FIG. 4A), rather than in the configuration illustrated in FIG. 5.

Of course, the system 500 may include appropriate piping and valves to direct one or more fluids to one or more of the resin beds 502 and the liquid-liquid extraction cells 214 as desired.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of recovering rare earth elements from a rare earth-containing material, the method comprising:
   at least partially oxidizing rare earth elements of a rare earth-containing material to form an at least partially oxidized rare earth-containing material;
   after at least partially oxidizing rare earth elements of the rare earth-containing material, contacting the at least partially oxidized rare earth-containing material with a solution formulated and configured to dissolve rare earth elements from the at least partially oxidized rare earth-containing material and form a solution including a plurality of rare earth elements dissolved therein;
   after forming the solution including a plurality of rare earth elements dissolved therein, contacting the solution including the plurality of rare earth elements dissolved therein with at least one of a liquefied gas or a supercritical fluid having a first concentration of nitric acid to selectively remove at least a first rare earth element from the solution; and
   contacting the solution including the plurality of rare earth elements dissolved therein with the at least one of the liquefied gas or the supercritical fluid having a second concentration of nitric acid to selectively remove at least a second rare earth element from the solution.

2. The method of claim 1, further comprising:
   selecting the rare earth-containing material to comprise a phosphor powder, wherein contacting the at least partially oxidized rare earth-containing material with a solution comprises contacting the phosphor powder with the solution; and
   prior to contacting the phosphor powder with the solution formulated and configured to dissolve rare earth elements from the at least partially oxidized rare earth-containing material, immersing a glass material including the phosphor powder attached to at least some surfaces of the glass material in an acoustic medium and sonicating the acoustic medium to remove the phosphor powder from the at least some surfaces.

3. The method of claim 2, further comprising, prior to contacting the phosphor powder with the solution, adding a metal complexing agent to the acoustic medium and removing mercury from the phosphor powder while sonicating the acoustic medium.

4. The method of claim 2, further comprising selecting the acoustic medium to comprise liquid carbon dioxide.

5. The method of claim 2, further comprising crushing used fluorescent lamps to form the glass material including the phosphor powder.

6. The method of claim 1, wherein contacting the at least partially oxidized rare earth-containing material with a solution formulated and configured to dissolve the at least partially oxidized rare earth elements from the rare earth-containing material comprises contacting the at least partially oxidized rare earth-containing material with at least one acid selected from the group consisting of nitric acid, sulfuric acid, and hydrochloric acid.

7. The method of claim 1, wherein contacting the at least partially oxidized rare earth-containing material with a solution formulated and configured to dissolve the rare earth elements from the at least partially oxidized rare earth-containing material comprises one of:
   dissolving rare earth elements from the at least partially oxidized rare earth-containing material with a liquid comprising at least one of an acid or a ligand to form the solution and contacting the solution with a fluid comprising at least one of a liquefied gas or a supercritical fluid; or dissolving rare earth elements from the at least partially oxidized rare earth-containing material directly in the fluid.

8. The method of claim 7, further comprising selecting the fluid to comprise one or more of at least one ligand, at least one solvent modifier, or at least one acid adduct.

9. The method of claim 7, further comprising adsorbing the rare earth elements dissolved in the solution on at least one resin bed.

10. The method of claim 7, wherein contacting the solution with a fluid comprising the at least one of a liquefied gas or a supercritical fluid comprises contacting the one of the liquefied gas or supercritical carbon dioxide with a stripping solution comprising one or more of at least one acid or at least one ligand.

11. The method of claim 1, further comprising selecting the one of the liquefied gas or the supercritical fluid to comprise an acid adduct comprising tributyl phosphate and nitric acid.

12. The method of claim 11, further comprising selecting a concentration of the nitric acid to be between about 4.0 M and about 8.0 M.

13. A method of recovering rare earth elements from a material, the method comprising:
   exposing a material comprising a plurality of rare earth elements to a supercritical fluid comprising one or more of at least one acid adduct, at least one ligand, or at least one solvent modifier, and configured and formulated to dissolve the rare earth elements to form a rare earth-laden supercritical fluid comprising dissolved rare earth elements therein;
   contacting an adsorbent within at least one resin bed with the rare earth-laden supercritical fluid and adsorbing at least some of the rare earth elements on the adsorbent to remove substantially all of the rare earth elements from the rare earth-laden supercritical fluid and form a substantially pure fluid;
   contacting the adsorbent with at least one solvent formulated and configured to strip at least some of the rare earth elements from the adsorbent; and
   recycling, to the supercritical fluid, at least a portion of the substantially pure fluid after contacting the adsorbent with the rare earth-laden supercritical fluid.

14. The method of claim 13, further comprising, prior to exposing the material comprising a plurality of rare earth elements to the supercritical fluid, exposing the material to at least one of at least one acid or at least one ligand to dissolve the rare earth elements in the at least one acid or the at least one ligand and form an aqueous acid solution.

15. The method of claim 13, further comprising providing a plurality of resin beds, each resin bed of the plurality of resin beds comprising an adsorbent material formulated and configured to adsorb a different rare earth element from the rare earth-laden supercritical fluid than the other resin beds of the plurality of resin beds.

16. The method of claim 15, wherein contacting an adsorbent within at least one resin bed with the rare earth-laden supercritical fluid comprises adsorbing at least a first type of rare earth element on a first resin bed of the plurality of resin beds and adsorbing at least a second type of rare earth element on a second resin bed of the plurality of resin beds.

17. The method of claim 16, wherein contacting the adsorbent with at least one solvent formulated and configured to strip at least some of the rare earth elements from the adsorbent comprises contacting the first resin bed with a first solvent formulated and configured to strip the first type of rare earth element from the first resin bed and contacting the second resin bed with a second solvent formulated and configured to strip the second type of rare earth element from the second resin bed.

18. The method of claim 13, wherein contacting the adsorbent with at least one solvent formulated and configured to strip at least some of the rare earth elements from the adsorbent comprises contacting the adsorbent in a first resin bed with a first solvent formulated and configured to strip a first rare earth element from the first resin bed and contacting the adsorbent in the first resin bed with at least a second solvent formulated and configured to strip at least a second rare earth element from the first resin bed.

19. The method of claim 13, further comprising contacting the adsorbent in a first resin bed with the at least one solvent formulated and configured to strip the at least some of the rare earth elements from the adsorbent while contacting an adsorbent within a second resin bed with the rare earth-laden supercritical fluid.

20. The method of claim 13, further comprising contacting the rare earth-laden supercritical fluid with a stripping solution in at least one liquid-liquid extraction cell.

21. A method of recovering rare earth elements from a rare earth-containing material comprising a phosphor powder, the method comprising:
   immersing a glass material including the phosphor powder attached to at least some surfaces of the glass material in an acoustic medium and sonicating the acoustic medium to remove the phosphor powder from the at least some surfaces of the glass material;
   after removing the phosphor powder from the at least some surfaces of the glass material, contacting the phosphor powder with a solution formulated and configured to dissolve rare earth elements from the phosphor powder and form a solution including a plurality of rare earth elements dissolved therein; and
   exposing the solution including the plurality of rare earth elements dissolved therein to one of a liquefied gas or a supercritical fluid to isolate the rare earth elements from each other.

* * * * *

UNITED STATES PATENT AND TRADEMARK OFFICE
CERTIFICATE OF CORRECTION

PATENT NO. : 10,533,239 B2  
APPLICATION NO. : 15/340610  
DATED : January 14, 2020  
INVENTOR(S) : Robert Vincent Fox et al.

Page 1 of 1

It is certified that error appears in the above-identified patent and that said Letters Patent is hereby corrected as shown below:

In the Specification  
    Column 6,    Line 2,     change "octyl(phenyl)N,N-dii sobutylcarbamoyl-"  
                                           to -- octyl(phenyl)N,N-diisobutylcarbamoyl- --

Signed and Sealed this  
Eighteenth Day of February, 2020

Andrei Iancu  
*Director of the United States Patent and Trademark Office*